(12) United States Patent
Tyler

(10) Patent No.: US 11,382,396 B1
(45) Date of Patent: Jul. 12, 2022

(54) UMBRELLA HOLDER FOR VEHICLES

(71) Applicant: Laken Tyler, Deland, FL (US)

(72) Inventor: Laken Tyler, Deland, FL (US)

( * ) Notice: Subject to any disclaimer, the term of this patent is extended or adjusted under 35 U.S.C. 154(b) by 272 days.

(21) Appl. No.: 16/887,811

(22) Filed: May 29, 2020

(51) Int. Cl.
| | | |
|---|---|---|
| *A45B 11/00* | (2006.01) | |
| *B60R 11/00* | (2006.01) | |
| *B60R 7/12* | (2006.01) | |
| *A45B 23/00* | (2006.01) | |

(52) U.S. Cl.
CPC ............... *A45B 11/00* (2013.01); *B60R 7/12* (2013.01); *B60R 11/00* (2013.01); *A45B 2023/0025* (2013.01); *B60R 2011/0022* (2013.01); *B60R 2011/0082* (2013.01)

(58) Field of Classification Search
CPC ............. B60R 11/00; B60R 2011/0022; B60R 2011/0082; B60R 7/12; A45B 11/00; A45B 2023/0025
USPC .......................................................... 135/16
See application file for complete search history.

(56) References Cited

U.S. PATENT DOCUMENTS

| | | | | |
|---|---|---|---|---|
| 5,150,728 | A | | 9/1992 | Stark |
| 5,287,871 | A | * | 2/1994 | Trice ....................... B60J 11/00 |
| | | | | 135/21 |
| 5,385,161 | A | * | 1/1995 | Loker ..................... A45B 11/00 |
| | | | | 248/205.5 |
| 6,959,715 | B2 | * | 11/2005 | Siegel ..................... B60R 11/00 |
| | | | | 135/16 |
| 7,967,274 | B1 | * | 6/2011 | Stallings, Jr. .......... A45B 11/00 |
| | | | | 248/537 |
| 8,240,323 | B2 | * | 8/2012 | Lee ......................... B60R 11/00 |
| | | | | 160/63 |
| 8,479,962 | B2 | * | 7/2013 | Hall ........................ B60R 11/00 |
| | | | | 224/567 |
| 9,321,336 | B2 | * | 4/2016 | Sasaki .................... B60J 11/08 |
| 9,775,416 | B2 | * | 10/2017 | Harris .................... A45B 19/04 |
| 9,827,917 | B1 | * | 11/2017 | Jones ..................... B60R 11/00 |
| 10,005,401 | B1 | * | 6/2018 | Siqueira .................... B60R 7/12 |
| 10,099,542 | B2 | | 10/2018 | Teague |
| 10,668,863 | B2 | * | 6/2020 | Ferreri .................... B62B 9/147 |
| 2013/0256355 | A1 | * | 10/2013 | Gatto-Weising ........ B60R 11/00 |
| | | | | 224/482 |
| 2015/0266428 | A1 | * | 9/2015 | Ishikawa .................... B60R 7/12 |
| | | | | 224/558 |
| 2016/0221513 | A1 | * | 8/2016 | Parlow ....................... B60R 7/12 |

* cited by examiner

*Primary Examiner* — Justin M Larson
(74) *Attorney, Agent, or Firm* — Sanchelima & Associates, P.A.; Christian Sanchelima; Jesus Sanchelima

(57) ABSTRACT

An umbrella holder including a holder assembly, an arm assembly and a vehicle assembly is disclosed. The holder assembly includes an arm slot that extends the length of the holder. Mounted within the arm slot is an arm from the arm assembly. The arm swivels within the arm slot to permit desired positioning thereof. The arm includes a channel that houses a retractable arm within. The retractable arm extends and retracts from the channel. The retractable arm includes a claw mounted to a distal end thereof. The claw opens and closes to grip an umbrella in an open configuration. The umbrella provides cover to either of the front or rear door entrances of the vehicle. Thereby allowing a user to load items into the vehicle, while being covered and protected by the open umbrella from weather elements. The user is protected even while both hands are preoccupied by other items.

14 Claims, 3 Drawing Sheets

UMBRELLA HOLDER FOR VEHICLES

BACKGROUND OF THE INVENTION

1. Field of the Invention

The present invention relates to an umbrella holder for vehicles and, more particularly, to an umbrella vehicle holder that permits users to be shielded by an opened umbrella even while the user's hands are fully occupied.

2. Description of the Related Art

Several designs for umbrella holders for vehicles have been designed in the past. None of them, however, include a rain shielding device for vehicle passengers comprising an arm pivotally mounted the inside face of the B pillar of a motor vehicle having a spring-loaded clamp on the distal end of the arm for removably holding the shaft of an umbrella. The present invention allows the user to be able to take cover under an open umbrella even as the user's hands are preoccupied with objects that are being loaded into a vehicle.

Applicant believes that a related reference corresponds to U.S. Pat. No. 10,099,542 for a vehicle attached shielding assembly for protecting a user from the elements. Applicant believes another related reference corresponds with U.S. Pat. No. 5,150,728 for a hands free mounting system for umbrellas. None of these references, however, teach of a device having a pivotally mounted arm attached to the interior of the vehicle allowing an open umbrella to shield passengers at the front or rear of the vehicle. Additionally, the present invention includes a spring-loaded clamp that allowing the securement of umbrellas of different dimensions.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an umbrella holder that can be retrofitted inside of existing vehicles.

It is another object of this invention to provide an umbrella holder that can hold umbrellas of different dimensions.

It is still another object of the present invention to provide an umbrella holder that can hold an umbrella in an open configuration to shield a user from the elements while the hands of the user are occupied.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
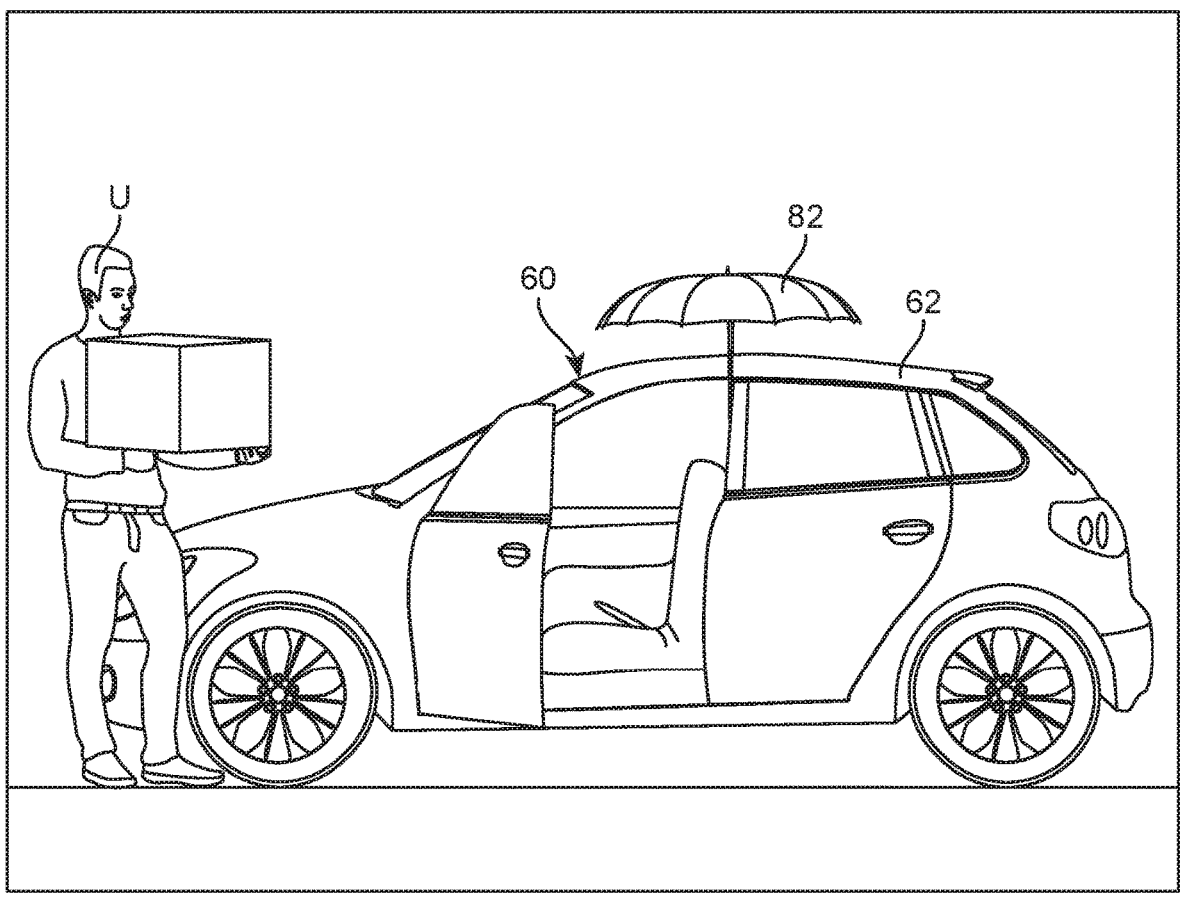
FIG. 1 represents an operational setting in which the umbrella holder 10 is used to hold an umbrella 82 in an open configuration allowing a user to be shielded from the elements while both of the user's hands are preoccupied.

Referring now to the drawings, where the present invention is generally referred to with numeral 10, it can be observed that it basically includes a holder assembly 20, an arm assembly 40 and a vehicle assembly 60.

An umbrella holder 10 allows a user U to be able to be shielded from the elements with an umbrella 82 in the open configuration even while the hands of user U are preoccupied with other objects. It is to be understood that umbrella holder 10 may preferably be mounted within a vehicle 62 of vehicle assembly 60. More specifically, umbrella holder 10 may be mounted to the B pillar 62a of vehicle 62. This allows user U to be able to load items within vehicle 62 during rain, snow, or hail without needing to hold or carry umbrella 82, as best illustrated in FIG. 1. Thereby facilitating and expediting the process of loading vehicle 62 to minimize the amount of time that user U has to spend exposed in hazardous weather conditions.

Figure 2:
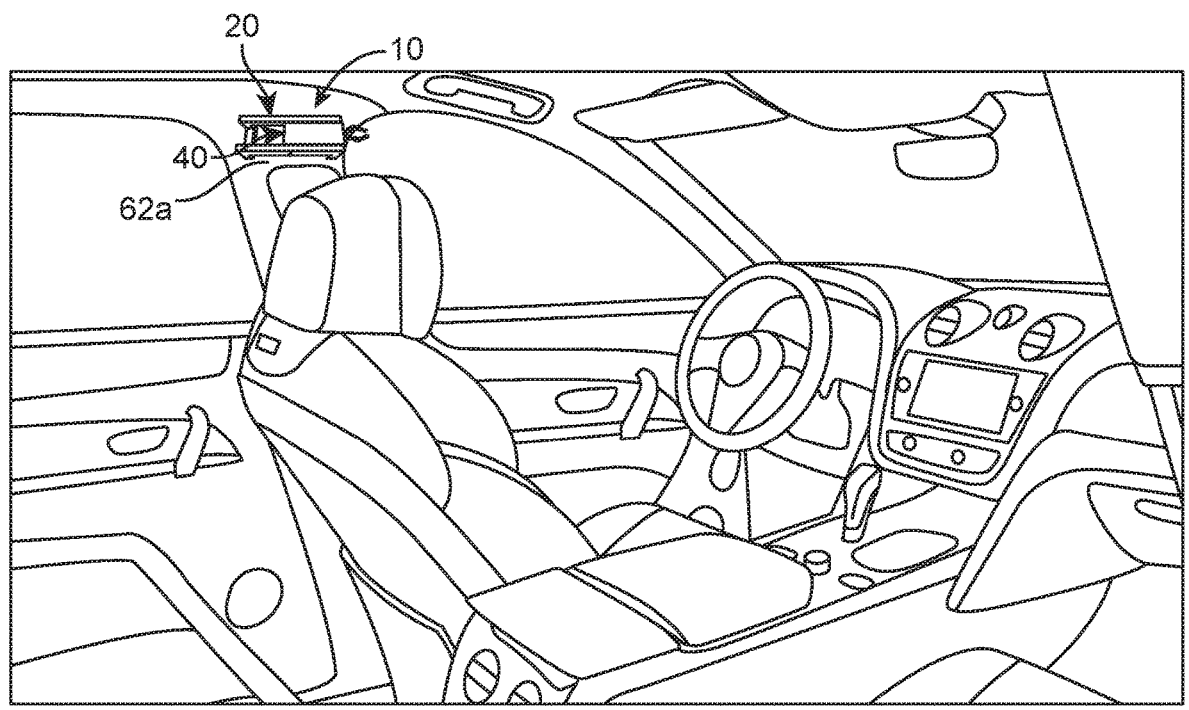
FIG. 2 shows the umbrella holder 10 mounted inside of a vehicle 62.

As best seen in FIG. 2, umbrella holder 10 may be mounted within vehicle 62. It may be preferable that umbrella holder 10 be mounted above of the seatbelt within vehicle 62. More specifically, umbrella holder 10 may be mounted on the panel between the front door and rear door on either of the driver or passenger side.

Figure 3:
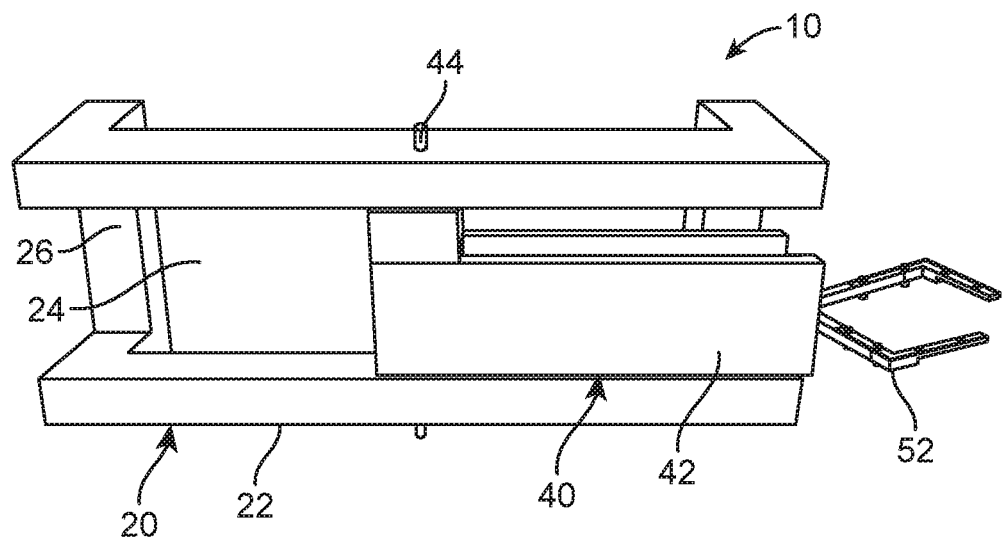
FIG. 3 illustrates an isometric view of the present invention, in a closed configuration.

Umbrella holder 10 may include holder assembly 20, as best seen in FIG. 3. Holder assembly 20 may include holder 22. Holder 22 may have a substantially rectangular shape in one embodiment. Holder 22 can be seen to have a C shaped configuration. It may be suitable for holder 22 to be made of plastic, metal, wood, rubber, stainless steel, aluminum, or combinations thereof. It may be preferable for holder 22 to have a length greater than a height thereof. Holder 22 may include an arm slot 24. Arm slot 24 may extend horizontally. In one embodiment, arm a lot 24 may be substantially rectangular in shape. It may be preferably for arm slot 24 to extend an entire length of holder 24. Arm slot 24 may partially extend across the height of holder 22. It is to be understood that arm slot may also partially extend the width of holder 22. Arm slot 24 may be entirely open on lateral sides thereof. Arm slot 24 may be closed along a top and bottom side of holder 22. Arm slot 24 may cooperate with arm assembly 40.

Holder assembly 20 may further include attaching portions 26. It can be seen that each of attaching portions 26 may be C shaped, in one embodiment. Attaching portions 26 may allow mounting of holder 22 to an interior of vehicle 62. Attaching portions may be secured to vehicle 62 with fasteners such as nails, adhesives, screws, hook and loop straps or the like as known in the art. It is to be understood that attaching portions 26 may preferably be in constant abutting contact with an interior of vehicle 62. Attaching portions 26 may be located on a rear side of holder 22. Preferably, attaching portion 26 may be on distal ends of holder 22. It can be seen that attaching portions 26 may extend outwardly and away from holder 22. Attaching portions 26 may extend an entire height of holder 22 and be perpendicular to arm slot 24. Attaching portions 26 may each extend vertically and have a height greater than a length. It is to be understood that attaching portions 26 may be parallel to each other. Attaching portions 26 may define the width of holder 22.

Figure 4:
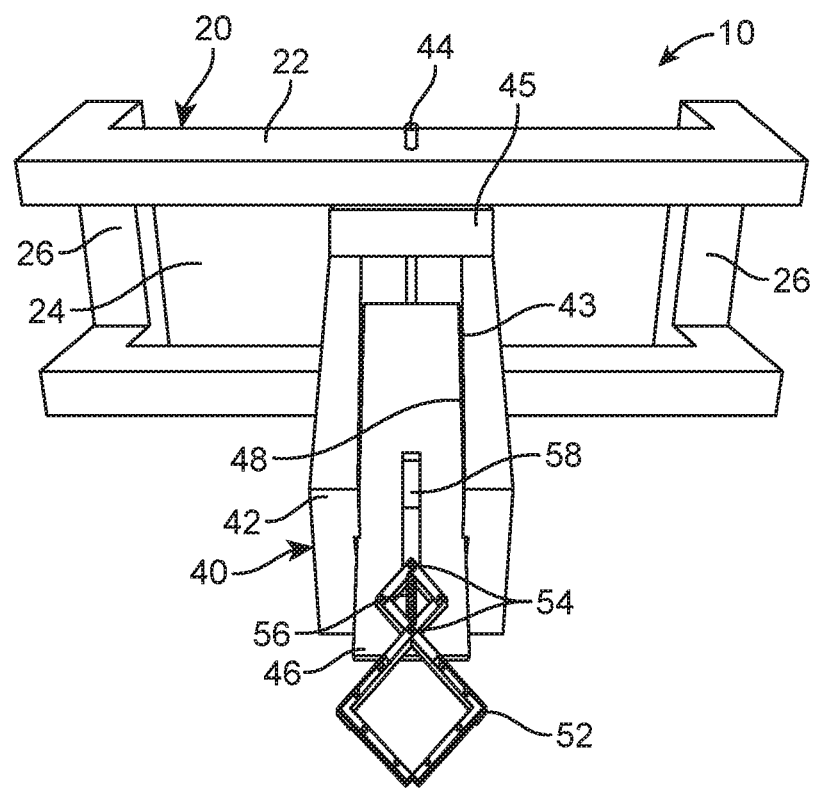
FIG. 4 is a representation of the pivotally mounted arm 42 swiveling within holder 22 to position the umbrella holder 10 as needed to shield the front or rear passenger side.

As best seen in FIG. 4, umbrella holder 10 may include arm assembly 40. Arm assembly 40 may aid in holding and positioning umbrella 82 as needed to protect user U from the elements such as rain. Arm assembly 40 may include arm 42. Arm 42 may be substantially rectangular, in one embodiment. Arm 42 may be mounted and secured within arm slot 24. Arm 42 may swivel within arm slot 24. Arm 42 may have a closed and open configuration within arm slot 24, as best seen in FIGS. 3 and 4, respectively. In the closed configuration, arm 42 may be entirely flush within arm slot 24. In the closed configuration, arm 42 may be parallel to the top and bottom portions of holder 22. It is to be understood that in the closed configuration, arm 42 may be perpendicular to attaching portions 26. In the open configuration, arm 42 may swivel within arm slot 24. It is to be understood that arm 42 may swivel freely horizontally. Arm 42 may include a channel 43. Channel 43 may extend the entire length of arm 42. Arm 42 may be entirely open at both distal ends due to channel 43. Channel 43 may be used to house other components of arm assembly 40 such as a retractable arm 46 and rails 48.

A pivot 44 may be used to secure arm 42 to holder 22. Additionally, pivot 44 may allow arm 42 to swivel freely within arm slot 24 for proper positioning of arm 42 as needed by user U. Pivot 44 may be centrally mounted onto and through holder 22. Pivot 44 may extend vertically and perpendicularly through arm slot 24. Pivot 44 may have a height greater than holder 22, in one embodiment. It can be seen that pivot 44 may extend outwardly from holder 22. Pivot 44 may secure arm 42 to holder 22 by extending through a distal end of arm 42. Thereby allowing arm 42 to remain attached to holder 22 while being able to pivot about 180 degrees.

In the preferred embodiment, there may be a securing portion 45 to help secure arm 42 with pivot 44. Securing portion 45 may be mounted atop of arm 42 and entirely above of channel 43. Securing portion 45 may extend from a top of arm 42 and a bottom of arm slot 24. Securing portion 45 may have a width less than arm 42. However, securing portion 45 may have a width greater than that of channel 43. Securing portion 45 allows for added stability when arm 42 is secured within arm slot 24 to permit smooth pivoting and movement of arm 42.

Importantly, within channel 43 may be retractable arm 46 and rails 48. Rails 48 may be used to secure retractable arm 46 within channel 43. Rails 48 may permit retractable arm 46 to extend and retract from channel 43. Preferably, rails 48 may be located along the sidewalls of channel 43. In the preferred embodiment, rails 48 may extend the entire length of arm 42 and channel 43. Additional rails 48 that correspond with rails 48 mounted within channel 43 may be mounted to the lateral sides of retractable arm 46. Rails 48 permit retractable arm 46 to extend outwardly from arm 42 a predetermined distance. Thereby allowing for umbrella 82 to be positioned in a manner that provides adequate protection from the elements to user U.

At a front distal end of retractable arm 46 may be a claw 52. Claw 52 may be used to grasp and hold umbrella 82. Claw 52 open and close to release and grasp, respectively, umbrella 82. Preferably, claw 52 may grasp the shaft portion of umbrella 82. Mounted to claw 52 may be pins 54. Pins 54 may extend outwardly and away from claw 52. It is to be understood that pins 54 may also extend outwardly and away from channel 43. Pins 54 may be spaced apart a predetermined distance. It is to be understood that pins 54 may be slidable. Pins 54 may move towards and away from each other to open and close, respectively, claw 52. In the preferred embodiment, one of pins 54 nearest claw 52 is stationary, while one of pins 54 furthest from claw 52 may be movable. Pins 54 may forward and backwards relative to claw 52. Mounted on to pins 54 may be a spring 56. Spring 56 may be extended between pins 54. Spring 56 may cooperate with pins 54 to open and close claw 52 as needed by user U. Spring 56 may be fully expanded as pins 54 move away from each other. This helps to close claw 52. When the present invention is in the resting position, spring 56 may preferably be expanded. Spring 56 may compress to close claw 52 and grasp umbrella 82. Pins 54 may be moved towards each other to compress spring 56 and open claw 52. Umbrella 82 may be received between claw 52 when opened. Subsequently, pins 54 may be moved away from each other to secure umbrella therebetween. Simultaneously, spring 56 may expand.

To facilitate the moving of pins 54 by user U, a lever 58 may be mounted to one of pins 54. Preferably, lever 58 may be mounted to one of pins 54 furthest from claw 52. User U may pull lever 58 to cause pins 54 to move away from each other, spring 56 to expand and claw 52 to close. User U may push lever 58 to cause pins 54 to move towards each other, spring 56 to compress and claw 52 to open. Lever 58 may include a grip portion that allows user U to easily operate lever 58 as needed.

The present invention may be used hold umbrella U in an open configuration to allow user U to load items into vehicle 62. User U may be protected from the elements even while both hands are preoccupied by contents that are being loaded into vehicle 62. With the present invention, user U can expedite the process of loading vehicle 62 to get out of hazardous weather conditions as fast as possible.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A system for an umbrella holder comprising:
 a. a holder assembly including a holder, said holder having an arm slot;
 b. an arm assembly including an arm, said arm swivelable within said arm slot, said arm including a retractable arm, said retractable arm having a claw mounted to a distal end thereof, said claw having an open and closed configuration;
 c. a vehicle assembly including a vehicle, said holder secured within said vehicle on a B pillar of said vehicle; and
 d. an umbrella, said umbrella secured to said claw, said claw grasping a shaft of said umbrella in the closed configuration, said umbrella being open and extending outside of said vehicle providing cover to a user with occupied hands.

2. The system of claim 1, wherein said arm slot extends horizontally across said holder.

3. The system of claim 1, wherein said holder includes attaching portions at lateral sides of said holder, said attaching portions rearwardly extending outwardly and away from said holder, said attaching portions being in constant abutting contact with said vehicle to secure said holder to said vehicle.

4. The system of claim 3, wherein said attaching portions are vertical and parallel to each other.

5. The system of claim 1, wherein said arm is secured to said holder with a pivot, said pivot extending vertically through said holder and said arm, said pivot having a height greater than that of said holder.

6. The system of claim 1, wherein said arm includes a channel, said channel extending the entire length of said arm.

7. The system of claim 6, wherein said retractable arm is received within said channel, said retractable arm slidable in and out of said channel with rails, said rails extending the entire length of said channel and the entire length of said retractable arm.

8. The system of claim 1, wherein a securing portion is mounted atop of said arm, said securing portion extending between said arm and said holder, said securing portion being entirely above of said channel, said securing portion extending an entire width of said arm.

9. The system of claim 1, wherein said claw is secured to said retractable arm with pins, a spring, and a lever.

10. The system of claim 9, wherein said claw is secured to said retractable arm with said pins, said spring extending between said pins, said lever secured to a rear end of said claw.

11. The system of claim 10, wherein said lever moving towards said claw compresses said spring and opens said claw, said lever moving away from said claw expands said spring and closes said claw.

12. The system of claim 1, wherein said arm can swivel freely within said arm slot 180 degrees.

13. A system for an umbrella holder comprising:
  a. a holder assembly including a holder, said holder having an arm slot, said holder further including attaching portions at lateral sides of said arm, said attaching portions extending outwardly and away from said holder, said attaching portions being vertical and parallel to each other;
  b. an arm assembly including an arm, said arm swivelable within said arm slot, said arm having a channel, said channel extending an entire length of said arm, said arm centrally secured to said holder with a pivot, said pivot extending vertically and entirely through said holder and said arm, said pivot having a height greater than a holder height, said arm assembly including a securing portion, said securing portion is mounted atop of said arm, said securing portion extending between said arm and said holder, said securing portion being entirely above of said channel, said securing portion extending an entire width of said arm, said arm including a retractable arm within said channel, said retractable arm secured within said channel with rails, said rails permitting said retractable arm to extend and retract, said rails extending entirely along a length of said channel, said retractable arm having a claw mounted to a distal end thereof, said claw having an open and closed configuration, said claw is secured to said retractable arm with pins, a spring, and a lever, said claw is secured to said retractable arm with said pins, said spring extending between said pins, said lever secured to a rear end of said claw, said lever moving towards said claw compresses said spring and opens said claw, said lever moving away from said claw expands said spring and closes said claw;
  c. a vehicle assembly including a vehicle, said holder secured within said vehicle onto a B pillar of said vehicle, said attaching portions being in constant abutting contact with vehicle interior; and
  d. an umbrella, said umbrella secured to said claw, said claw grasping a shaft of said umbrella in the closed configuration, said umbrella being open and extending outside of said vehicle providing cover to a user with occupied hands.

14. The system of claim 13, wherein said arm is swivelable within said arm slot 180 degrees.

* * * * *